United States Patent

Brown et al.

[11] Patent Number: 5,857,496
[45] Date of Patent: Jan. 12, 1999

[54] WEAVING APPARATUS INCLUDING SWITCHED RELUCTANCE DRIVE

[75] Inventors: Geoffrey T. Brown, Harrogate; Michael J. Turner, Leeds, both of England

[73] Assignee: Switched Reluctance Drives Limited, Harrogate, United Kingdom

[21] Appl. No.: 844,133

[22] Filed: Apr. 18, 1997

[30] Foreign Application Priority Data

Apr. 19, 1996 [GB] United Kingdom .................. 9608215

[51] Int. Cl.$^6$ .......................... D03D 49/04; D03D 51/02
[52] U.S. Cl. ......................... 139/110; 318/254; 318/701; 388/811
[58] Field of Search .................. 318/701, 254; 139/110; 388/811

[56] References Cited

U.S. PATENT DOCUMENTS

| | | | |
|---|---|---|---|
| 4,513,790 | 4/1985 | Sainen et al. | 139/110 |
| 4,585,037 | 4/1986 | Kimbara | 139/110 |
| 4,593,236 | 6/1986 | Oesterle et al. | 139/110 |
| 5,170,821 | 12/1992 | Yoshida | 139/110 |
| 5,202,610 | 4/1993 | Frye et al. | 318/6 |

FOREIGN PATENT DOCUMENTS 0 802 270  10/1997  European Pat. Off. .

*Primary Examiner*—Andy Falik
*Attorney, Agent, or Firm*—Arnold, White & Durkee

[57] ABSTRACT

Weaving apparatus comprises a warp beam bearing warp threads, a loom on which the warp threads are woven with weft threads, and a take-up roller for taking up the woven material. The loom is powered by a main loom motor. Either or both of the take-up roller and the warp beam are controlled by switched reluctance motors. The switched reluctance motor is able to maintain correct tension in the warp threads or the woven material without generating excessive heat in maintaining a desired position.

20 Claims, 4 Drawing Sheets

WEAVING APPARATUS INCLUDING SWITCHED RELUCTANCE DRIVE

FIELD OF THE INVENTION

This invention relates to a weaving apparatus.

BACKGROUND OF THE INVENTION

It is well known that a piece of woven fabric consists of two sets of threads running at right angles to each other. A weaving machine comprises a roll of warp threads on a warp beam that feeds the warp threads to the healds of the loom, creating a shed of them by raising and lowering them as necessary in preparation for creating the desired weave pattern. The weft thread is drawn laterally through the shed by a shuttle, gripper, air-jet or other means. After the weft has been threaded through the shed, the woven cloth is beaten up and eventually exits the loom part of the weaving machine onto a take-up roller and is then fed to a cloth roller for storage.

Letting off the warp threads from the warp beam is an important aspect in the weaving process as the tension in the warps has a direct effect on the quality of the final cloth. Similarly, precision in taking up the cloth by means of the take-up roller is also an important aspect in the quality of the cloth. The taking up operation has to be arranged so that the finished cloth is drawn from the loom by a carefully controlled amount at a precise moment. Due to the intermittent motion in weaving, as the weft threads are inserted into the shed, this take-up involves drawing the cloth forward in small increments of position. The magnitudes of the increments are related to the thickness of the weft and the required density of the weave.

In automatic weaving, many of the labor intensive functions are performed without the need for operator input. Part of the process of automation has been to control the let-off of the warp threads and the take-up of the cloth according to predetermined control regimes. Early automatic systems used mechanical means to control let-off and take-up, the latter being mechanically locked to the main drive shaft of the loom. More recently, electric motors have been used for let-off and take-up functions, offering increased flexibility and better control of the weaving process.

While these concepts have been well recognized for some time, implementation of electronically controlled let-off and take-up in an automatic weaving machine has proved to be difficult, requiring costly solutions. The control demands associated with let-off and take-up in a typical weaving machine are severe, and require the apparatus positioning the warp beam and the take-up roller rapidly to accelerate and decelerate their considerable inertias (which vary as the weaving process passes the warp from beam to roller). A typical test specification for the drive system might require the electric motor to accelerate between 0 and 2,500 rpm in 0.1 second whilst continuously and accurately following a position reference.

Tensioning the warp beam and positioning the take-up roller has been automated in the past using high performance dc servo motors which have been able to respond both rapidly and accurately to the position and speed control demands. However, dc servo units of the required standard are relatively expensive items. It has not been considered possible in the past to use more simple electric motor systems in these applications (whether ac or dc) because they have been unable to offer the necessary levels of positional accuracy and responsiveness. Furthermore, dc servo units, while being the best available option up to now in spite of the many different forms of electric motor known to exist, suffer from various disadvantages that are exacerbated by the environment in a weaving factory which is likely to be contaminated by airborne dust and fibrous matter.

A conventional dc motor has a wound rotor, excited via a commutator and a set of brushes. This method of commutation is prone to faults in the presence of airborne contamination which means the motors require regular cleaning and/or replacement if they are not to have a significantly increased risk of failure in operation. The inevitable arcing which occurs during commutation is also a fire risk in the contaminated environment of a weaving factory.

More recently, permanent-magnet rotor brushless dc servo motors, utilizing electronic commutation, have been used. These eliminate the problems associated with commutators and brushgear, but are costly. Furthermore, the presence of flammable airborne matter dictates that the servo motor must have a smooth, unfinned exterior surface, so that dust cannot easily accumulate. For the same reason, guard meshes cannot be used to prevent operators from touching the motor housing. Thus, the exterior motor case temperature must, for the safety of the operatives, remain low at all times. The necessity for a low case temperature, together with the enforced absence of cooling fins (or other practicable means of increasing the cooling surface area) means that, in the prior art, a relatively large (and hence costly) servo motor is required, compared with that which would be used in less specialized applications.

The intermittent motion requirements of the weaving machine cause still further cooling problems in any event, due to the high peak torques required to move the relatively large load inertia quickly and accurately. Furthermore, to optimize the dynamic response it is also the practice to supply some types of brushless servo motor continuously with a magnetizing current. This results in a degree of heating of the motor, even when it is not supplying torque to the load. In weaving, this is especially a problem when the motor is required to perform a locking or "holding" function in which it must at all times maintain a set, stationary position of the take-up roller. Conventional motors require the aforementioned magnetizing current to ensure that the servo motor does not permit excessive movement when an external disturbance torque is applied. This continuous magnetizing current leads to further heating and again contributes to the requirement to oversize the motor in order to provide the required performance with acceptable temperature rise of the casing.

Thus, it will be appreciated that the modern automatic weaving machine uses expensive brushless dc servo units for let-off and take-up in the absence of a better alternative rather than because they are inherently suited to the tasks.

SUMMARY OF THE INVENTION

It is an object of an embodiment of the present invention to provide a weaving machine having automated let-off and/or take-up functions that avoids the problems associated with the prior art.

In one form the invention provides a weaving apparatus comprising a loom for weaving warp and weft threads, a warp beam, a warp beam motor operable to move the warp beam to introduce the warp threads to the loom, a take-up roller for drawing the woven material from the loom, a switched reluctance motor operably connected with the take-up roller, and control means responsive to the output of the loom to produce a control signal to rotate the switched reluctance motor to take up the woven material.

In an alternative form the invention provides a weaving apparatus comprising a loom for weaving warp and weft threads, a warp beam, a take-up roller, a take-up motor operable to move the take-up roller to draw the woven material from the loom, warp tension monitoring means, a switched reluctance motor operably connected with the warp beam, and control means responsive to the output of the warp tension monitoring means to produce a control signal to rotate the switched reluctance motor to maintain a desired tension on the warp.

The switched reluctance machine is described in the paper "The Characteristics, Design and Applications of Switched Reluctance Motors and Drives" by Stephenson and Blake, presented at the PCIM '93 Conference and Exhibition at Nurnberg, Germany, Jun. 21–24, 1993.

The rotor of the switched reluctance motor is typically a simple set of laminations mounted on a journalled shaft. It has neither windings nor magnets. Thus, there is no need for a mechanical commutator to complete an electrical circuit between the rotor and the source of electrical power. The switched reluctance motor, like a brushless dc servo, therefore avoids the problems associated with commutators and brushgear. The switched reluctance motor, compared with the servo motor it replaces, is less costly to manufacture. This is because the rotor requires no permanent magnet materials, which are in themselves expensive and also difficult to handle, and also because the (stator) windings are simpler and, hence, easier to manufacture. For reasons which will be explained, the total volume of materials required is less, so further reducing cost.

Though the switched reluctance motor has found application in general variable-speed drive systems, it is a commonly held view that it is unsuitable for positioning applications because of two features inherent in the machine. Firstly, the torque is not constant with rotor position even if the current supplied to the phase winding is constant. It is generally considered that this makes the machine difficult to control when positioning it against a load to a precise position. Secondly, even at constant rotor position, the torque is not a linear function of phase current. Many researchers have studied this aspect of switched reluctance machines and those skilled in the art will be familiar with the complex algorithms which have been developed to attempt to overcome this problem. Nevertheless, this non-linearity is still perceived as a major difficulty in the application of switched reluctance systems to precision positioning applications.

The switched reluctance motor presents a surprising improvement in the art of weaving machine automation for other reasons that are not associated with the benefits of switched reluctance motors in more typical applications. Firstly, significant benefits arise due to the fact that the switched reluctance motor operates with a magnetic flux and winding current which is related to the required torque. Therefore, the heating of the motor decreases as load is reduced. Operation without a non-torque-productive "magnetizing current" is possible because of the short electrical time constant of the switched reluctance motor which permits the drive to increase shaft torque from zero to maximum very rapidly. This means that when a disturbing torque is applied the drive can respond to and counteract the disturbance, maintaining the desired position, before the shaft has moved to an excessive degree. Whilst stationary, therefore, the switched reluctance motor, unlike the machines used in prior art, is energized only when a disturbing torque is applied, and will otherwise remain at rest with the windings completely unexcited. This avoids unnecessary heating of the motor.

Secondly, whilst the switched reluctance motor is rotating, the magnitude of magnetic flux—and hence the required stator current—is regulated according to the required torque, and is never greater than necessary. Again, this brings improvements in thermal performance over the prior art.

The high acceleration and deceleration required of the warp beam and the take-up roller are more manageable using a switched reluctance motor because the rotor has a low inertia compared with that of the equivalent rotor of a brushless dc servo unit.

The high efficiency inherent in the switched reluctance drive, which is well known, offers a further reduction in losses in, and hence heating of, the motor.

Thus, it can be seen that a well-designed switched reluctance drive system for the control of loom take-up and/or let-off offers a number of important advantages over the prior art. The motor is smaller. Because of this, and also because of its much simpler construction, the switched reluctance motor is cheaper. Because of the low thermal losses, explained above, a small motor can still achieve the required low surface temperature. Also because of the low thermal losses and because losses reduce with decreasing load, the motor may remain at rest in a defined position for prolonged periods without undue thermal stress, provided that the opposing torque from the load is not excessive.

BRIEF DESCRIPTION OF THE DRAWINGS

The present invention can be put into practice in various ways, some of which will now be described by way of example with reference to the accompanying drawings in which.

DETAILED DESCRIPTION OF THE INVENTION

Figure 1:
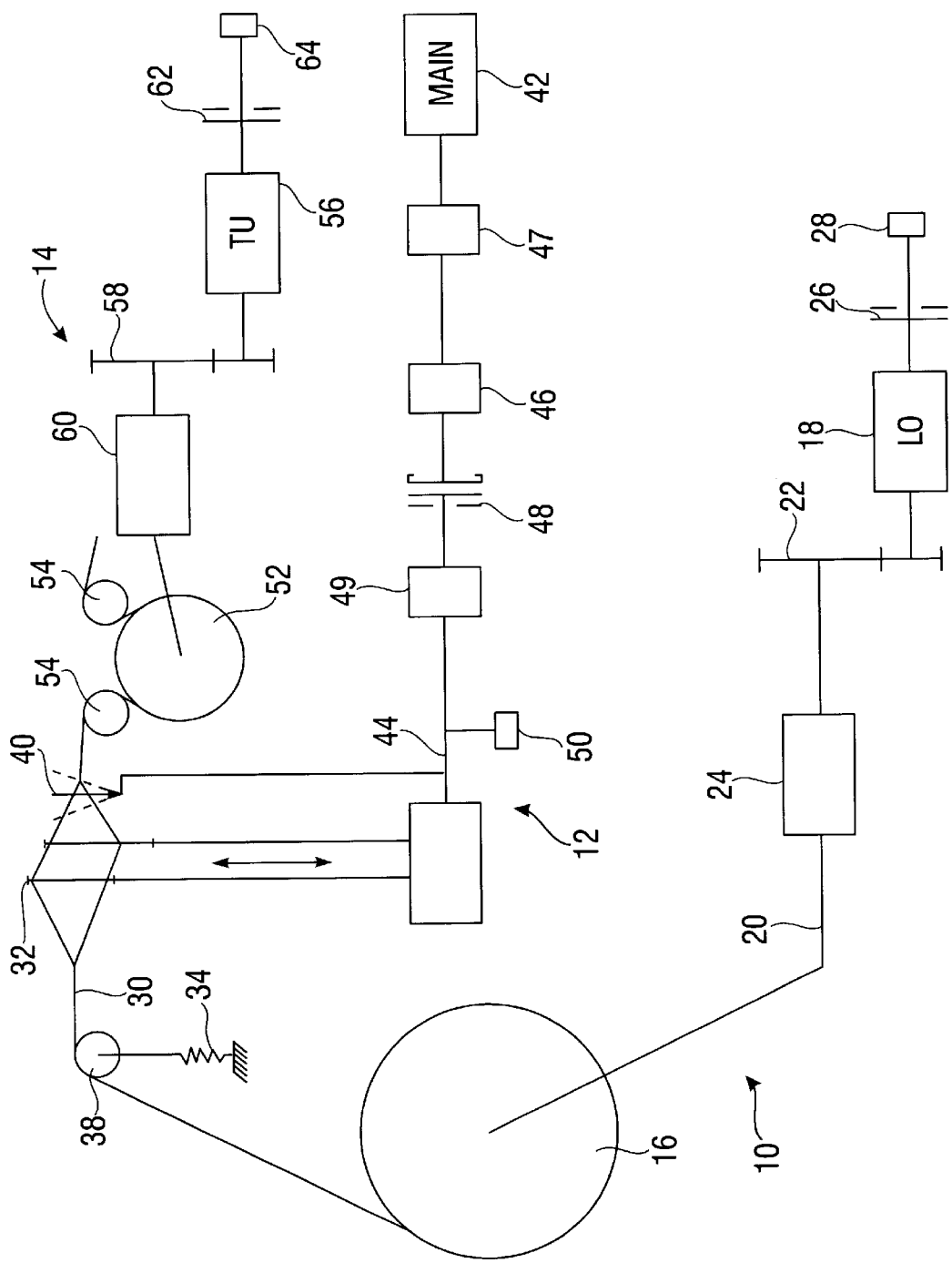
FIG. 1 is a schematic diagram of a weaving machine according to the present invention.

Referring to FIG. 1, a weaving machine comprises a let-off unit 10, a loom 12 and a take-up unit 14. The let-off unit 10 comprises a let-off motor 18 which is coupled to a warp beam 16. The let-off motor 18 is a 4-phase, 8 stator pole/6 rotor pole switched reluctance motor. It is engaged with a shaft 20 via a variable ratio gearbox 22 and a fixed ratio gearbox 24. A conventional solenoid-actuated holding brake 26 and a resolver 28 are mounted on the rotor shaft of the let-off motor 18. The resolver 28 serves as an encoder, as is well known in the art, and provides feedback of let-off motor speed and position, required for commutation of the switched reluctance motor, for control of the let-off motor shaft velocity and, additionally, by the main loom control system for informational and supervisory purposes. The let-off motor 18 is sealed in a dust-proof housing to prevent the airborne dust present in a weaving site ingressing the motor.

As is conventional in the weaving art, warp threads 30 are taken off the warp beam and passed through a set of dobby actuated healds 32 which are arranged selectively to lift the warp threads 30 according to the desired pattern to create a shed for the weft thread (not shown). In between the warp beam 16 and the healds 32, the warp threads 30 pass over a warp tension sensor 34 which may, for example, be in the form of a strain gauge operably attached to an idler wheel 38 which is movable in response to the tension in the warp threads to cause the strain gauge 34 to change electrical resistance in accordance with the changing warp tension. The measure of the warp tension so derived is subtracted from a reference tension value, to obtain a "tension error" signal, which is used to control the let-off motor velocity and so regulate the warp tension to the desired reference value.

Cam-driven sley swords 40 are arranged to beat up the woven weft threads in conventional manner. The dobbies of the healds and the cams of the sley swords are driven by a main shaft 44 which supplies the majority of the mechanical power required by the loom. The main shaft 44 is driven by an asynchronous motor 42 typically rated at 7.5 kW. The relatively high motor speed is matched to the lower (slower) main shaft speed by means of a gearbox 49 and a belt drive or a further gear box 47. Rapid starting and stopping of the main shaft 44 is made possible by the clutch/brake 48 and the flywheel 46. The flywheel also reduces the effect on speed of the varying inertial load at the main shaft, thus permitting the asynchronous motor 42 to operate at reasonably low values of slip. A resolver 50 is arranged to sense rotation of the shaft 44 and to derive a shaft position information signal from which is derived a position reference signal for control of the take-up drive.

The woven fabric is led to the take-up unit 14 which comprises a take-up roller 52 and a pair of pinch wheels 54. The position of the take-up roller 52 is determined by a take-up motor 56 in the form of another switched reluctance motor of the same specification as the let-off motor 18. The take-up motor 56 turns the take-up roller 52 by means of a further reduction gearbox of variable ratio 58 and one of fixed ratio 60. As with the let-off motor 18, the motor shaft of the take-up motor 56 carries a holding brake 62 and a resolver 64. The resolver 64 provides velocity and position feedback required both for correct commutation of the take-up switched reluctance drive motor and for control of the take-up motor shaft position and speed.

Control of the main motor driving the loom and the let-off and take-up motors positioning the warp beam and the take-up roller are coordinated in a central loom controller which is not shown. This provides the speed and position command signals required by the let-off and take-up drives, respectively. In so far as the central loom controller is arranged to control the weaving performed by the loom, the controller arrangements are known in the art and will not be described in further detail here.

Figure 2:
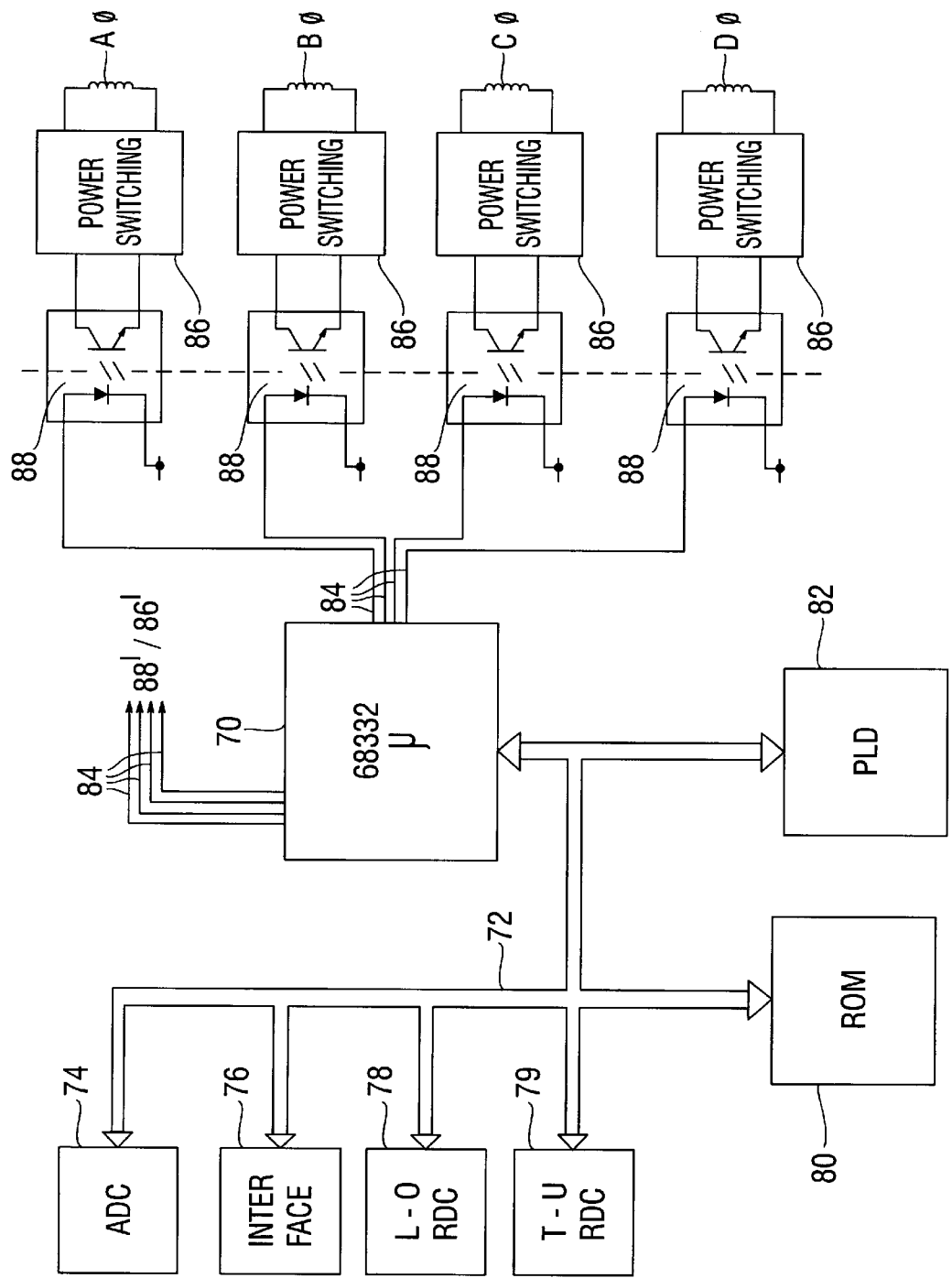
FIG. 2 is a block diagram of a controller for use in the machine of FIG. 1.

The let-off and take-up switched reluctance motors are controlled by a system shown in FIG. 2. Some elements of this system may be shared—in order to reduce costs—between the let-off and take-up motor controllers.

A microcontroller 70 is connected by a databus 72 with an analogue-to-digital converter 74 (ADC), an interface 76, a resolver-to-digital converter 78 for the let-off drive (L-ORDC) and a corresponding converter 79 for the take-up drive (T-URDC), a read only memory (ROM) 80 and a gate array or programmable logic device (PLD) 82. In this embodiment, the processor is a 68332 unit as manufactured by Motorola, Inc. of Phoenix, Ariz., U.S.A.

Concerning the driving of the let-off warp beam 16, output ports 84 from the processor 70 are respectively connected to switching circuits 86 through opto-isolators 88 for each phase of the let-off motor 18. In this case the motor is a four-phase device and there are four independently actuatable opto-isolators 88 by means of which the four separate power switching circuits 86 for the phases A, B, C and D of the motors are controlled. As is well known in the switched reluctance motor art, the power switching circuits 86 are each connected with a phase winding associated with two or more stator poles of the motor. Similar control arrangements under the command of the processor 70 for the phases of the take-up motor 56 for positioning the take-up roller 52 are provided on signal lines 84' for similar switching circuits 86' and opto-isolators 88' shown generally in FIG. 4.

Figure 3:
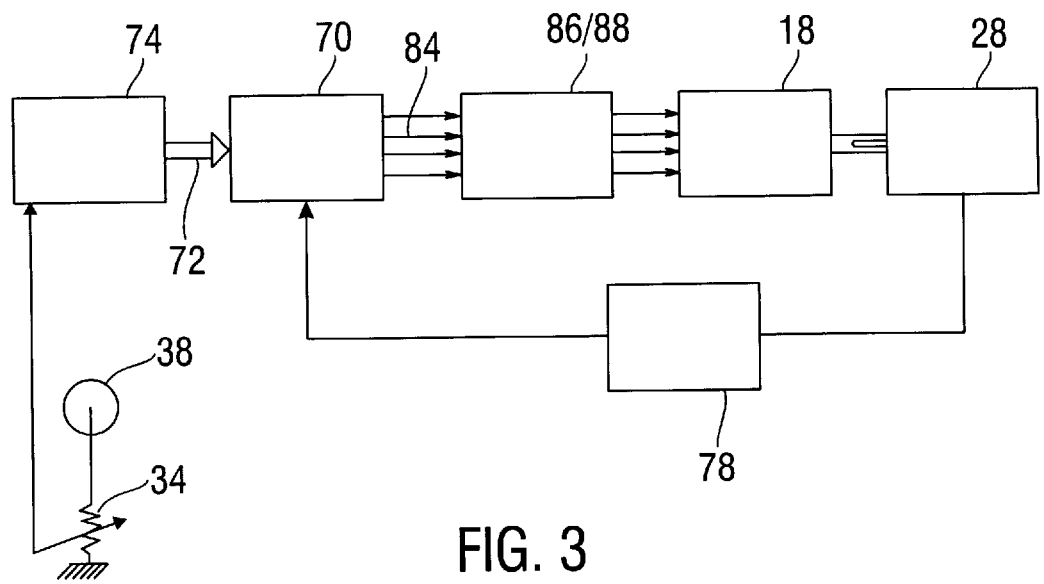
FIG. 3 is a block diagram of a let-off feedback loop for use in the machine of FIG. 1.

While the weaving machine is running, the warp tension should be held substantially constant in order to maintain consistency in the woven fabric. The difference in the measured tension and the desired reference tension is the input to a conventional controller/compensator (e.g. a proportional-integral-differential controller) as is well known in the art. The compensator output may be an analogue speed demand signal which is the input to the switched reluctance letoff motor control, and which is converted to a digital signal by ADC 74, and subsequently passed to the digital bus 72. The microcontroller 70 is programmed to form a feedback control loop which regulates the let-off motor speed. The microcontroller 70 computes the difference between the speed demand signal and the actual let-off speed as determined by measurements made with the resolver 28 in conjunction with the L-ORDC 78. This speed error signal is processed (using software implementations of a suitable regulator, as is well understood in the art) to form a torque command signal which is used by the microcontroller 70 and the gate array 82, in conjunction with the memory 80, to determine the pattern of excitation of the let-off motor windings by the power switching circuitry 86. This configuration is shown schematically in FIG. 3.

Any increase in the tension of the warp will increase the speed demand signal as a result of a difference between the measured and reference tensions. The warp beam speed will therefore increase until the required value of warp tension is restored.

The resolver 28 is also used in controlling the switched reluctance motor itself. As with any switched reluctance motor, the timing of the phase energisation requires rotor position information. In a conventional switched reluctance motor a simple, relatively low-resolution rotor position transducer is used. However, as the weaving machine requires an accurate resolver for warp beam position information, the same data can be used as rotor position information for switch timing as well. The data can be used to control the switched reluctance motor as described in detail in EP-A-0756373.

It will be apparent to the skilled person that normal operation of the weaving machine will require a forward positioning motion only. However, the reverse direction may be required during setting-up of the loom.

Figure 4:
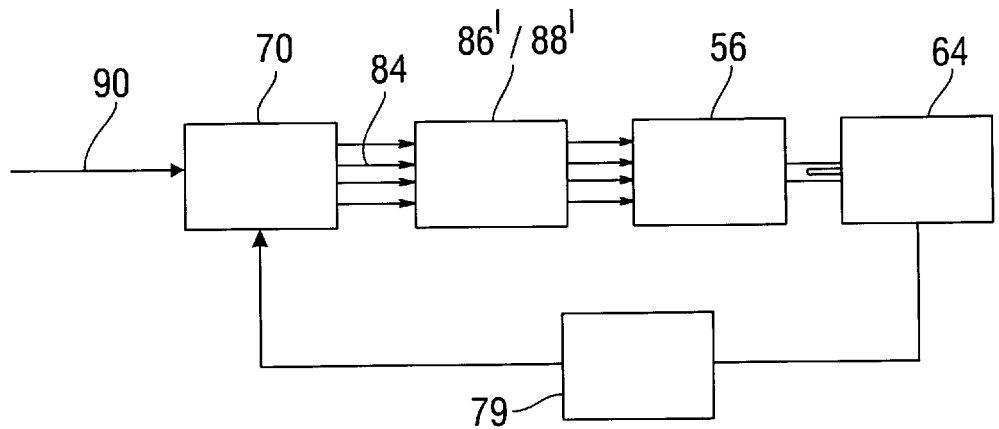
FIG. 4 is a block diagram of a take-up feedback loop for use in the machine of FIG. 1.

The take-up roller 52 powered by the take-up motor 56 is a position control system. As the fabric is produced it must be drawn off the loom by a positive intermittent motion of the take-up roller. In order to establish the position of the inserted weft threads on a repeatable basis, the take-up motor must follow the rotation of the main motor shaft 44 driving the loom, but at a fraction of the main motor speed. As with the let-off motor, the take-up motor is part of a closed loop, but comprising the take-up motor 56, the take-up resolver 64, the take-up resolver-to-digital converter 79 and the processor 70 as shown in FIG. 4. A duplicate of the opto-isolators 88 and the switching circuit 86 in the let-off unit are included, denoted by the numerals 88' and 86', respectively. The take-up drive forms the core of a position control loop as follows: the microcontroller 70 calculates the difference between the desired take-up motor shaft position 90 and its actual value as measured by resolver 64. The position error so derived is processed by a software implementation of a conventional proportional-plus-integral (P+I) controller. The resulting (processed error) signal forms the speed demand for an inner control loop, which functions in the same manner as already described for the let-off drive, the take-up speed being measured by the microcontroller 70 from information derived from the resolver 64 and the take-up resolver-to-digital converter 79.

As with the let-off motor, the take-up motor is sealed in a dust-proof housing.

The take-up motor speed and position, in following the movement of the main shaft, must take into account the gearboxes 58 and 60, the diameter of the take-up roller 52, and the required weft pick density. In this way, variations in the loom drive will be synchronized in the take-up motor. To this end, the position demand to the take-up motor is derived from the main shaft resolver 50 by the central loom controller, which takes into account the weft thread diameter, weaving pattern and weave density and generates a position demand 90 which moves the take-up motor 56 accordingly.

In this particular embodiment the let-off and take-up motors are similar four phase, eight stator pole and six rotor pole machines developing about 10 Nm and designed to provide the necessary acceleration between 0 and 2500 rpm in 0.1 sec. The relatively low rotor inertia is a valuable advantage of the switched reluctance motor, allowing it to achieve the acceleration and deceleration with a smaller motor size than would be the case with the heavier rotor of an equivalent brushless dc servo unit.

Another advantage of the present invention is that a switched reluctance motor can respond rapidly to a sudden change in the demanded torque, without need for any idling current. The winding current at any time is related to the required torque and, therefore, if zero torque is required, the current may also be zero. This gives rise to a particular advantage whilst setting up the loom, when it is desirable that the let-off and take-up motors hold the warp beam 16 and the take-up roller 52 in fixed positions, despite intermittent counter-torques being applied by operators during the set-up procedure. To accomplish this using a brushless permanent magnet motor requires that the motor windings be permanently energized with a magnetizing current, so that the motor can respond to the counter-torque sufficiently quickly, avoiding excessive positional error. The need for a magnetizing current in the brushless permanent magnet motor means that the motor may suffer from excessive heating. The switched reluctance motor avoids this problem because its windings are, under the aforementioned circumstances, only energized intermittently, and therefore heating is not likely to be a problem under the conditions for which the motor is designated to operate.

Returning to FIG. 2, and regarding the control of the power switching circuitry 86 by the microcontroller 70, it is convenient to pass the control signal across the optical isolators 88 in the form of a pulse-width modulated signal. The average value of this signal may then represent the desired current in the motor windings (A$\phi$–D$\phi$), whilst the frequency of the pulse-width modulated signal may be used to fix the frequency of operation of the power switching devices within the switching circuitry 86. This frequency may typically be ultrasonic (for example 20 kHz) so as to minimize acoustic noise from the drive but be as low as possible to minimize switching losses in the power electronics.

The means of applying a pulse width modulated output from the processor may be largely based on the same switched reluctance motor current control scheme for both the let-off and take-up motors. The following will refer to 'the motor' when it is intended to apply to either motor individually.

Figure 5:
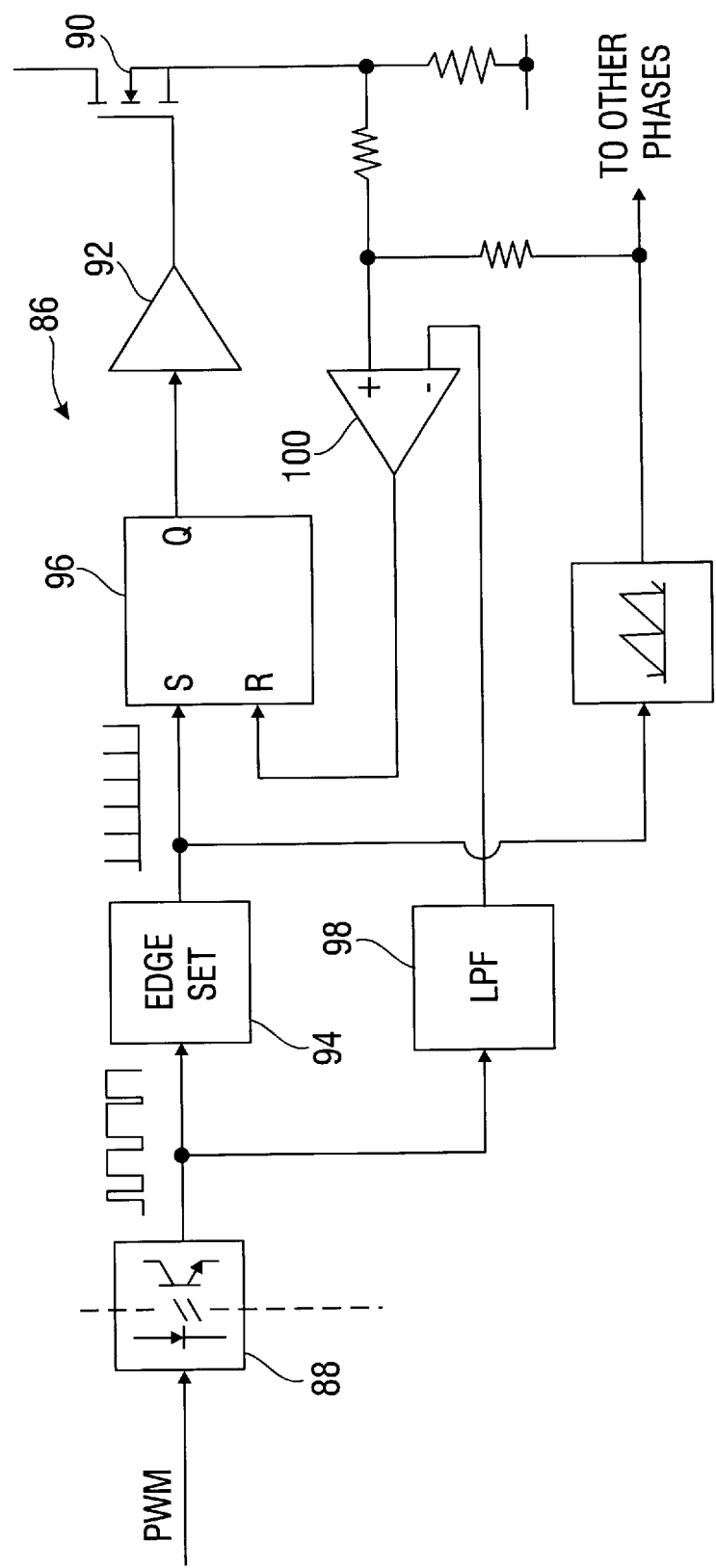
FIG. 5 is a schematic circuit diagram of a current controller according to the invention.

The current control circuitry shown in FIG. 5 is 'live', i.e. it is connected directly to the power switching elements 91 of the switching circuits 86 or 86'. Thus, a simple resistive current measurement can be used to monitor phase winding current, whilst keeping the signal-level electronics isolated by means of opto-isolators 88. The gate of the low-side power switching element 91 (in this case a MOSFET switch) can be driven directly, e.g. from logic gates via low-cost emitter-follower buffers 92. The high-side power switch requires a level-shift device or an additional opto-isolator (not shown). Suitable level-shift driver integrated circuits include the IR2112 manufactured by International Rectifier Corporation of El Segundo, Calif., U.S.A. and the IR2125 manufactured by the same company which offers high-side drive combined with over-current protection.

Referring to FIG. 5, the output of the processor 70 is the 20 kHz pulse width modulated (PWM) signal which is applied to an edge detector circuit 94 through the isolation of the single opto-isolator 88. This signal controls both the motor phase chopping frequency (which is locked to the leading-edges) derived by the edge detector and its analogue current reference (in the duty cycle). The PWM edges are used synchronously to set an SR flip-flop 96. The PWM signal is also low-pass filtered in a filter 98 to obtain a current reference for a winding current measurement comparator 100. This technique is the subject of European Patent Application No. 96307202.0.

Setting the flip-flop 96 closes the power switches for that phase, forcing the phase current in the phase winding to increase until the current reaches a set value. The comparator 100 resets the flip-flop when the current reaches the set value, the power switches 91 are turned off and the circuit waits for the next PWM clock edge. This control scheme may exhibit instability for duty cycles above 50%, and to maintain stability (and fixed-frequency operation) slope compensation must be added. The stability criteria can be shown using relatively straightforward linear algebra, and are well understood in the art. Discussions of slope compensation may be found in "Product and Applications Handbook" published by Unitrode Integrated Circuits Corporation, of Merrimack, N.H., U.S.A.

In the foregoing specification, the invention has been described with reference to a specific exemplary embodiment. It will, however, be evident that various modifications and changes may be made thereto without departing from the broader spirit and scope of the invention as set forth in the appended claims. For example, the present invention is applicable to reluctance machines having numbers of stator and rotor poles different from those discussed above. Further, the present invention is applicable to reluctance machines having a different number of phases than those discussed above in connection with the above example. It will also be appreciated that the advantages of a switched reluctance motor apply individually to the let-off and take-up motors as they do to their use together on the same weaving apparatus. The specification and drawings are, accordingly, to be regarded in an illustrative rather than a restrictive sense.

What is claimed is:

1. A weaving apparatus comprising a loom for weaving warp and weft threads, a warp beam, a warp beam motor operable to move the warp beam to introduce the warp threads to the loom, a take-up roller for drawing the warp and weft threads from the loom, a switched reluctance motor operably connected with the take-up roller, and control means to produce a control signal to rotate the switched reluctance motor to take up the warp and weft threads.

2. Apparatus as claimed in claim 1, including position detection means arranged to generate rotor position signals for the control means as information indicative of the position of the take-up roller.

3. Apparatus as claimed in claim 2 in which the switched reluctance motor includes a phase winding and the control means utilizes the output of the position detection means to control energization of the phase winding of the switched reluctance motor.

4. Apparatus as claimed in claim 1 in which the loom has a loom position indicator that provides an output signal indicative of the output of the loom and wherein, the control means being responsive to the output of the indicator.

5. Apparatus as claimed in claim 4 in which the control means are responsive to the output of the loom position indicator to generate a switched reluctance motor position demand signal.

6. Apparatus as claimed in claim 1 in which the control signal output of the control means is a pulse width modulated signal, the apparatus further comprising edge detector means responsive to the pulse width modulated signal, a flip-flop arranged to be set by the detected edges of the pulse width modulated signal, a low pass filter also arranged to receive the pulse width modulated signal to derive a current level signal therefrom, a comparator arranged to compare the current level signal and a signal indicative of switched reluctance motor current, the output of the comparator being arranged to reset the flip-flop when the signal indicative of the switched reluctance motor current exceeds the current level signal.

7. Apparatus as claimed in claim 1 in which the warp beam motor is a further switched reluctance motor.

8. A weaving apparatus comprising a loom for weaving warp and weft threads, a warp beam, a take-up roller, a take-up motor operable to move the take-up roller to draw the woven material from the loom, warp tension monitoring means, a switched reluctance motor operably connected with the warp beam, and control means responsive to the output of the warp tension monitoring means to produce a control signal to rotate the switched reluctance motor to maintain a desired tension on the warp.

9. Apparatus as claimed in claim 8, including position detection means arranged to generate rotor position signals for the control means as information indicative of the position of the warp beam.

10. Apparatus as claimed in claim 9 in which the control means are also responsive to the position detection means to control actuation of the switched reluctance motor.

11. Apparatus as claimed in claim 9 in which the control means are responsive to the warp tension monitoring means to generate a switched reluctance motor speed demand signal.

12. Apparatus as claimed in claim 8 in which the control signal output of the control means is a pulse width modulated signal, the apparatus further comprising edge detector means responsive to the pulse width modulated signal, a flip-flop arranged to be set by the detected edges of the pulse width modulated signal, a low pass filter also arranged to receive the pulse width modulated signal to derive a current level signal therefrom, a comparator arranged to compare the current level signal and a signal indicative of switched reluctance motor current, the output of the comparator being arranged to reset the flip-flop when the signal indicative of the switched reluctance motor current exceeds the current level signal.

13. Apparatus as claimed in claim 8 in which the take-up motor is a further switched reluctance motor.

14. A loom system for weaving warp and weft threads comprising:
   a warp beam,
   a warp beam motor coupled to the warp beam, the warp beam motor operable to move the warp beam to introduce the warp threads to the loom,
   a take-up roller for drawing the warp and weft threads from the loom,
   a first switched reluctance motor operably connected with the take-up roller, the switched reluctance motor including at least one phase winding;
   a first switching circuit coupled to the at least one phase winding of the first switched reluctance motor and to a source of electric power, the switching circuit having a control input; and
   a digital controller having a first output coupled to the control input of the first switching circuit, the digital controller producing output signals at the first output to control the coupling of the at least one phase winding of the first switched reluctance motor to the source of electric power.

15. The loom system of claim 14 further comprising a position detector having an output coupled to an input of the digital controller, the position detector providing an output signal indicative of the position of the take-up roller, the digital controller utilizing the output signal indicative of the position of the take-up roller to generate the output signals provided by the digital controller to the switching circuit.

16. The loom system of claim 14 wherein the warp beam motor comprises a second switched reluctance motor including at least one phase winding, wherein the loom system further includes a second switching circuit coupled to the at least one phase winding of the second switched reluctance motor and to the source of electric power, and wherein the digital controller has a second output coupled to a control input of the second switching circuit, the digital controller producing output signals at the second output to control the coupling of the at least one phase winding of the second switched reluctance motor to the source of electric power.

17. The loom system of claim 14 wherein the output signals at the first output of the digital controller comprise pulse-width modulated signals.

18. A loom system for weaving warp and weft threads comprising:
   a warp beam,
   a first switched reluctance motor operably connected to the warp beam, the first switched reluctance motor including a phase winding;
   a take-up roller for drawing the woven material from the loom,
   a motor operably connected with the take-up roller;
   a warp tension detector for producing at an output a signal indicative of the tension of the warp threads; and a digital controller having a first input coupled to receive the output of the warp tension detector, the digital controller producing output signals at a first output to control the energization of the phase winding of the first switched reluctance motor.

19. The loom system of claim 18 further comprising a warp beam position detector having an output coupled to a second input of the digital controller, the warp beam position detector providing an output signal indicative of the position of the warp beam, the digital controller utilizing the output signal indicative of the position of the warp beam to control the energization of the phase winding of the first switched reluctance motor.

20. The loom system of claim 18 wherein the motor operably connected with the take-up roller comprises a second switched reluctance motor including at least one phase winding coupled to a second output of the digital controller and wherein the digital controller produces output signals at the second output to control the energization of the phase winding of the second switched reluctance motor.

* * * * *